United States Patent [19]
Kobayashi et al.

[11] Patent Number: 4,788,489
[45] Date of Patent: Nov. 29, 1988

[54] POSITION SENSOR FOR USE IN VARIABLE HEIGHT AUTOMOTIVE SUSPENSION OR THE LIKE

[75] Inventors: Hiroshi Kobayashi, Yokohama; Yoshinobu Kida, Atsugi; Toshiro Ichikawa, Hiratsuka, all of Japan

[73] Assignees: Nissan Motor Co., Ltd., Yokohama; Atsugi Motor Parts Co., Ltd., Atsugi, both of Japan

[21] Appl. No.: 884,511

[22] Filed: Jul. 11, 1986

[30] Foreign Application Priority Data

| Jul. 12, 1985 | [JP] | Japan | 60-105421[U] |
| Jul. 12, 1985 | [JP] | Japan | 60-152549 |
| Jul. 12, 1985 | [JP] | Japan | 60-152548 |
| Sep. 9, 1985 | [JP] | Japan | 60-136791[U] |

[51] Int. Cl.⁴ ........................... G01R 27/26
[52] U.S. Cl. ............... 324/61 P; 340/870.37; 280/735
[58] Field of Search .............. 280/735, 707; 188/322.17, 322.18; 361/280; 73/658; 340/870.37; 324/61 R, 61 P

[56] References Cited

U.S. PATENT DOCUMENTS

| 3,564,397 | 2/1971 | Sargent | 340/870.37 |
| 3,566,222 | 2/1971 | Wolfendale | 340/870.37 |
| 3,948,359 | 4/1976 | Rogers . | |
| 4,206,401 | 6/1980 | Meyer | 340/870.37 |
| 4,288,793 | 9/1981 | Lotscher | 340/870.37 |
| 4,350,954 | 9/1982 | Seilly . | |
| 4,577,509 | 3/1986 | Moser | 73/658 |
| 4,587,850 | 5/1986 | Moser | 73/658 |
| 4,638,670 | 1/1987 | Moser | 73/658 |

FOREIGN PATENT DOCUMENTS

| 1525363 | 4/1968 | France | 340/870.37 |
| 56-162010 | 12/1981 | Japan . | |
| 57-88609 | 6/1982 | Japan . | |
| 57-177113 | 11/1982 | Japan . | |
| 57-178107 | 11/1982 | Japan . | |
| 60-252833 | 12/1985 | Japan . | |

Primary Examiner—Reinhard J. Eisenzopf
Assistant Examiner—Jose M. Solis
Attorney, Agent, or Firm—Foley & Lardner, Schwartz, Jeffery, Schwaab, Mack, Blumenthal & Evans

[57] ABSTRACT

In order to ensure a reliable body earth and insulate a capacitance type position sensor from external noise, an electrically conductive tube is insulatingly mounted within an electrically conductive housing. The capacitance developed between the tube and a piston rod which is reciprocally arranged therein is measured while the rod and the conductive body are electrically connected. By soundly grounding the rod a secure ground for the housing is established.

14 Claims, 10 Drawing Sheets

POSITION SENSOR FOR USE IN VARIABLE HEIGHT AUTOMOTIVE SUSPENSION OR THE LIKE

BACKGROUND OF THE INVENTION

1. Field of the Invention

The present invention relates generally to a position sensor and more specifically to a position sensor which is suited for use in rugged environments such as a automotive vehicle suspension which is adapted to permit the clearance between the bottom of the vehicle and the road surface to be adjusted.

2. Description of the Prior art

Figure 1:
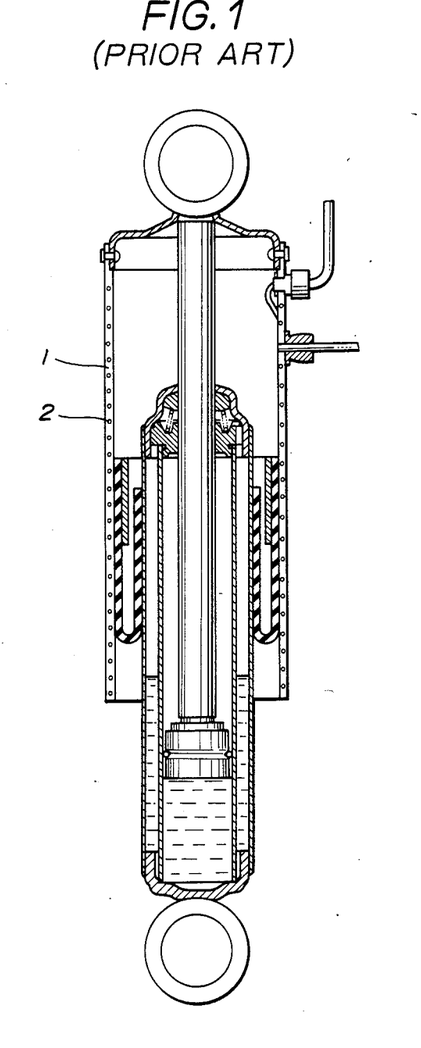
FIG. 1 shows the prior art arrangement discussed in the opening paragraphs of the instant disclosure.

In automotive vehicle suspensions which are adapted to permit the clearance between the vehicle and the road surface to be selectively adapted it has been proposed to equip members of the suspension such as shock absorbers with sensing arrangements which sense the degree to which the absorbers are exended. One example of such an arrangement is disclosed in Japanese Utility Model First Provisional Publication No. 57-88609. In this arrangement the absorber is constructed in a manner to include a non-magnetic non-conductive tubular sleeve member 1 in which a coil 2 is buried. The variation in the inductance developed by this coil 2 is used as a indication of the degree to which the shock absorber is extended.

However, in the event that the shock absorber is equipped with or disposed in the near vicinity of an electromagnetic valve or the like for the purposes of controlling the height of the vehicle, the noise generated by the operation of the valve is picked up by the inductance coil and interferes with the operation of the sensor. Further, the production of the outer sleeve member is relatively expensive.

SUMMARY OF THE INVENTION

It is an object of the present invention to provided a capacitance type position sensor which features a simple rugged design which enables secure earthing of the body in which the sensor is incorporated and which simultaneously shields the sensor from noise produced by nearby electromagnetic equipment.

In brief, the present invention takes the form of an arrangement wherein, in order to ensure a reliable body earth and insulate a capacitance type position sensor from external noise, an electrically conductive tube is insulatingly mounted within an electrically conductive housing. The capacitance developed between the tube and a piston rod which is reciprocally disposed therein is measured while the rod and the conductive body ar electrically connected. By grounding the rod a secure body earth for the housing is established.

More specifically, the present invention in its broadest sense takes the form of a device which is characterized by a housing containing a fluid of known dielectric constant, the housing being formed of an electrically conductive material; an elongate hollow member insulatingly supported within the housing in a contact free relationship therein and immersed in the fluid, the hollow member being formed of an electrically conductive material; a shaft reciprocatively disposed in the hollow member in manner to define a clearance therebetween, the shaft being formed of an electrically conductive material and supported within the hollow member in a contact free and electrically insulated relationship therewith, means for establishing simultaneous electrical connection between the housing and the shaft with a source of electrical ground; and a circuit for measuring the capacitance developed between the shaft and the hollow member.

DETAILED DESCRIPTION OF THE PREFERRED EMBODIMENTS

Figure 2:
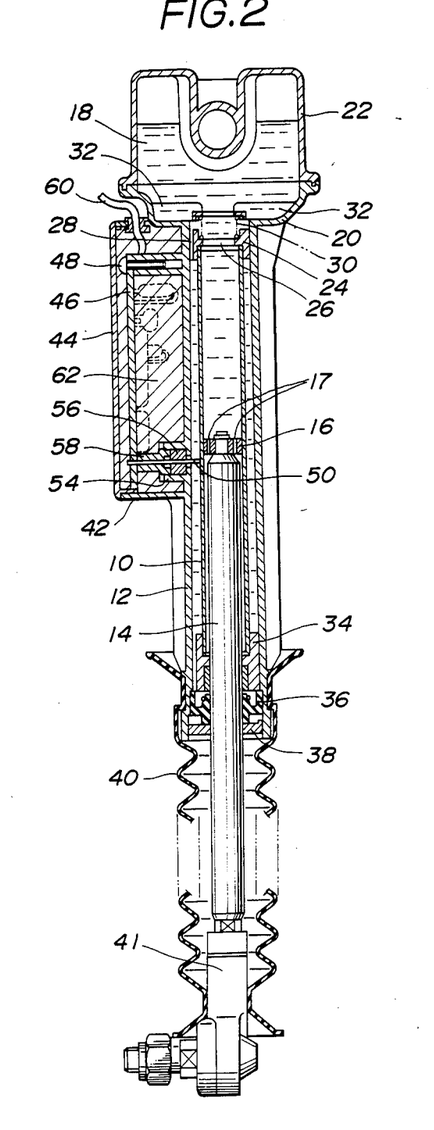
FIG. 2 is a sectional elevation of a vehicle shock absorber incorporating a first embodiment of the present invention.

FIG. 2 of the drawings shows a first embodiment of the present invention. This arrangement takes the form of a shock absorber for use in an automotive vehicle or the like. However, even though this and subsequent embodiments disclosed hereinafter are directed to shock absorbers for use in automotive vehicles or the like, it is to be understood that the present invention is not limited to use in such devices and may find application in situations wherein a rugged and reliable position sensor is required.

The arrangement of the first embodiment includes as major elements inner and outer tube members 10, 12. The outer of these tube members (12) is formed of an electrically conductive plastic resin such as 6-nylon which exhibits good structural strength, is non-flammable and resistant to corrosion. In order to properly fulfill the requirements of the present invention the outer tube member should be more than 2 mm thick and have an electrical conductivity of $10°-10^1$ Ω-cm.

The inner tube member 10 is electrically conductive and insulatingly mounted within the outer one 12 in a manner which will be detailed hereinlater. A piston rod 14 having a piston 16 fixed to one end thereof is reciprocatively disposed within the inner tube. The piston 16 is formed of an electrically insulating material arranged to maintain the piston rod 14 in a co-axial contact free relationship within the inner tube 10 and is provided with fluid transfer bores 17. The diameter of the piston rod 14 is selected to be close to that of the inner diameter of the inner tube 10.

A reservoir 18 is provided at the top of the shock absorber. This section is defined by a base arrangement 20 which is formed integrally with the outer tube 12 and a cap 22 member which is sealingly fitted onto the base.

Figure 3:
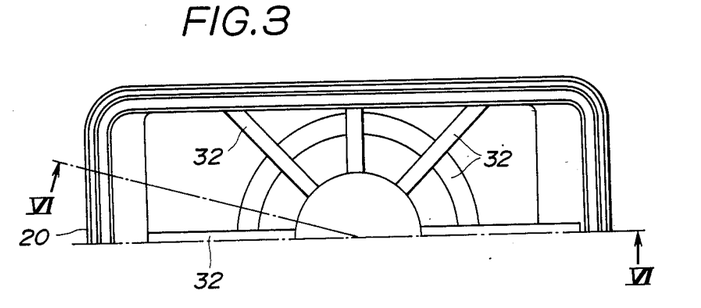
FIGS. 3 to 5 are plan and elevational sectional views of the upper section of the arrangement shown in FIG. 2.
Figure 4:
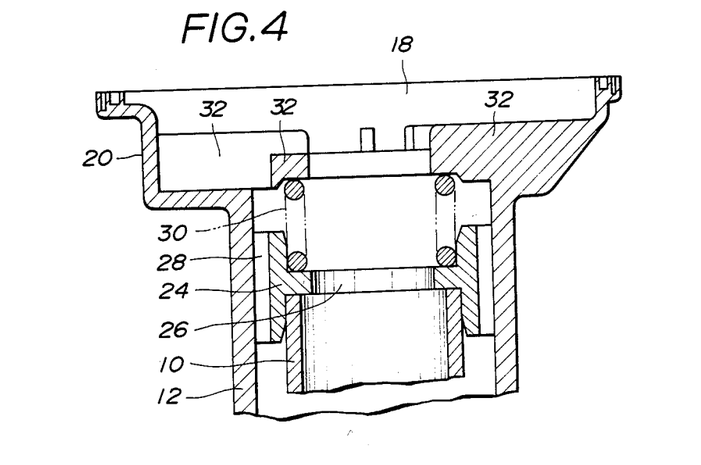
Figure 5:
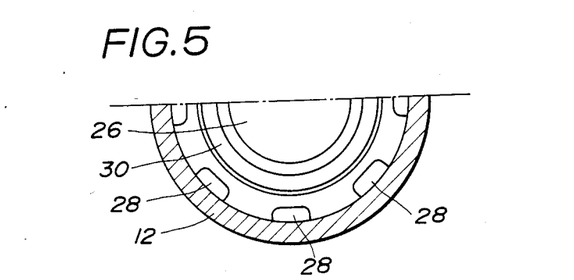

The upper end of the inner tube 10 is formed in a manner as shown in FIGS. 3 to 5 so as to permit free and constant fluid communication between the interior and exterior of the inner tube 10 and the reservoir 18. In this embodiment this construction includes a wheel-shaped circular electrically insulative member 24 which is formed with a through bore 26 in the middle and axial slots or channels 28 along the outer perimeter thereof. This member 24 is fitted onto the upper end of the inner tube as shown in FIG. 4. A spring 30 is disposed between the upper surface of the member and the lower face of a ribbing/web arrangement 32 formed in the mouth of the reservoir 18. When the inner tube 10 is fitted into the outer one this spring 30 is compressed in a manner which holds the upper end of the inner tube securely in place and prevents rattling or similar vibration which is apt to cause deterioration of the device with the passing of time.

The lower end of the inner tube 10 is fitted into an electrically insulative guide member 34 which has a shape similar to member 24 and which is formed with a castled or channeled outer periphery to permit the hydraulic fluid in the absorber device to contact the walls of the inner tube 10 to the level at which a seal member 36 is disposed hermetically close the end of the outer tube 12. The piston rod 14 is sealing disposed through seal member 36. A cover or cap 38 member is disposed in a slightly enlarged diameter portion of the outer tube 12.

An electrically conductive dust boot 40 is fitted over the lower end of the outer tube 12 and arranged to depend down around the lower end of the piston rod 14 and an electrically conductive connection member 41 fixed thereto. This boot 40, by way of example, is formed of a styrene-butadiene (SBR) rubber wherein carbon black is mixed with an ethylene base resin and which exhibits an electrical conductivity of $10^0$-$10^1$ $\Omega$-cm. This member establishes electrical contact between the outer tube 12 member and the piston rod 14 at a location close to the site at which the absorber is connected to a suspension or chassis element and ensures reliable body earthing of the outer tube 12 along with the piston rod 14.

A circuit housing or case 42 is formed integrally with the outer tube 12. This housing is arranged to receive therein a circuit including a CR oscillator and to be closed by a cap member 44. In this embodiment the circuit includes a printed circuit board 46 which is electrically connected with the outer tube member 12 via an electrically conductive pin 48. This circuit is arranged to produce a pulse signal by frequency dividing the output of the CR oscillator. Connection between the circuit board 46 and the inner tube 10 is established by a pin-like electrode 50 which is arranged to insulatingly project through an aperture formed in the outer tube. This aperture is formed so as to open into a sub-housing member or casing 54 in which a seal rubber 56 and collar 58 are disposed.

A cord 60 is disposed through an aperture formed in the cap member 44 and suitably connected with the circuit board 46.

The sensor circuit in this and subsequent embodiments can be formed so as to buried via moulding in a body 62 of urethane or the like plastic and pressed into place in the housing 42. This encasing of the relatively delicate elements of the circuit of course tends to protect the same from shock and from external electromagnetic radiation and/or noise while further facilitating easy assembly in the work place.

With the above described arrangement when the piston rod 14 is moved relative to the outer tube 12 in a manner which changes the length of the absorber the capacitance developed by the arrangement varies according to the following equation:

$$C = 2\pi\epsilon l/\log(a/b)$$

wherein:
C denotes capacitance;
l denotes the length of the piston rod within the inner tube;
a denotes the inner diameter of the inner tube;
b the outer diameter of the piston rod; and
$\epsilon$ the dialectric constant of the oil used in the absorber.

As is well known the dielectric constant of a liquid medium tends to decrease proportionally with the increase in temperature. However, as in this embodiment CR oscillator is used this effect can be offset by arranging one of the resistors in the circuit to be take the form of a thermistor. With this provision within the range of normally experienced temperatures accurate determation of the degree of extension of the absorber can be made by measuring the capacitance.

With the present invention as the outer tube 12 is securely grounded and the inner one 10 insulatingly mounted therein, the sensor arrangement tends be inherently shielded by the grounded outer member 12 against noise produced by other electromagnetically operated elements such as hydraulic control valves etc., thus increasing the reliability and accuracy of the device.

Figure 6:
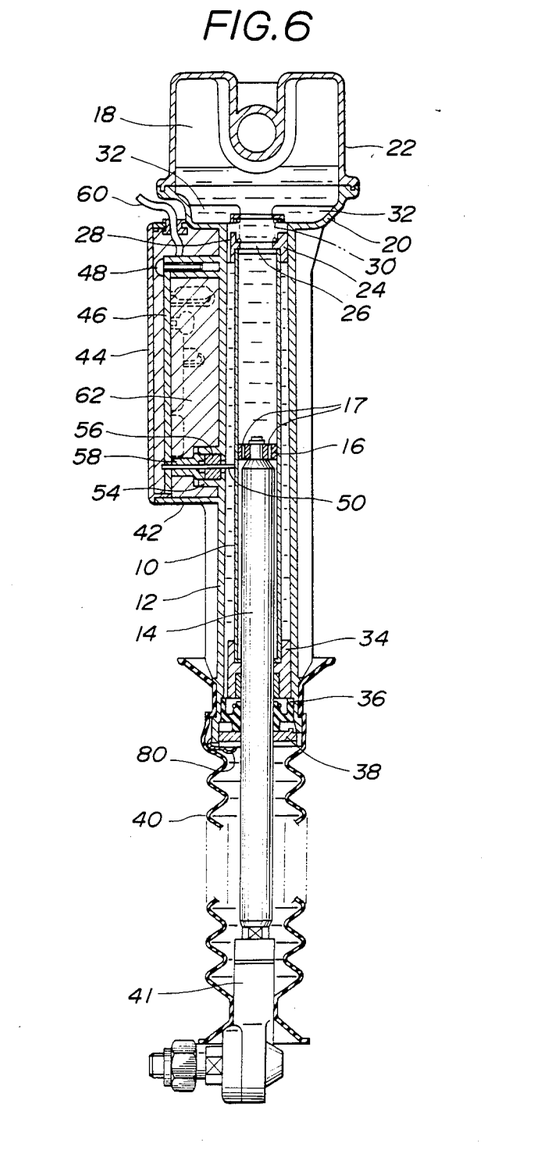
FIGS. 6 and 7 are sectional elevations of second and third embodiments of the present invention respectively.

FIG. 6 shows a second embodiment of the present invention. In this arrangement a brush 80 is added in the position shown. This ensures a good electrical connection between the outer tube 12 and the piston rod 14 which in combination with the conductive dust boot 40 ensures a reliable ground of the sensor.

Figure 7:
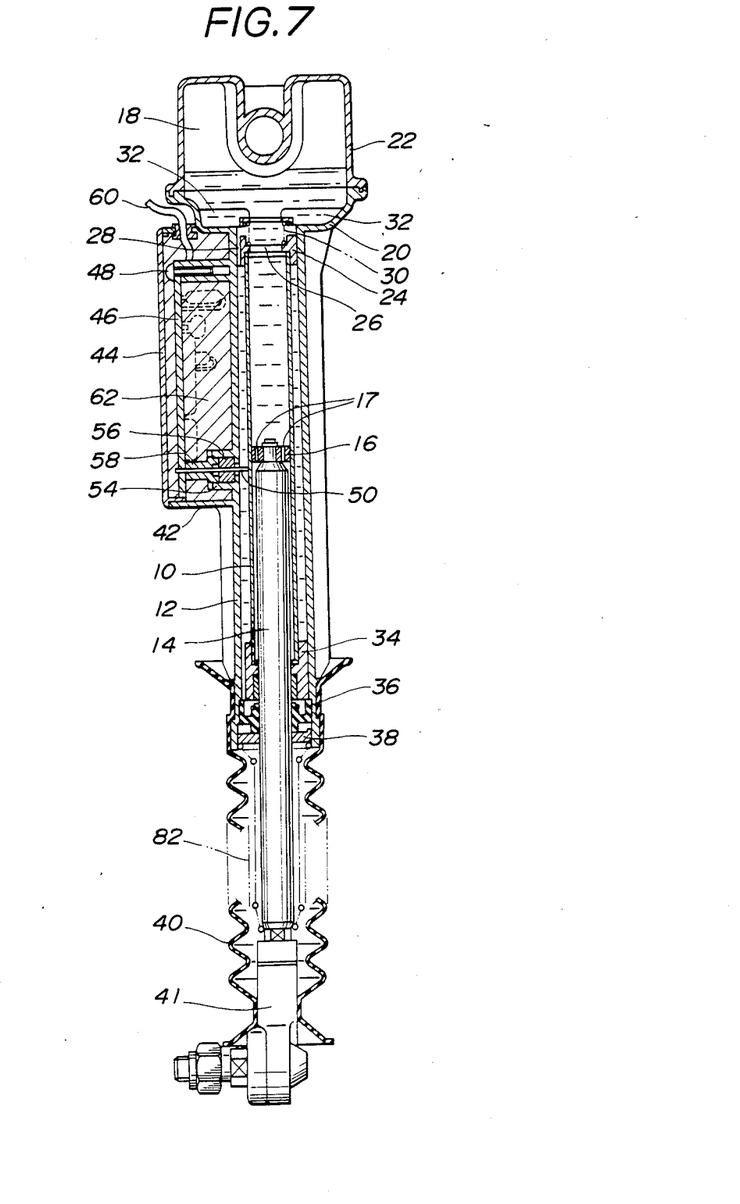

FIG. 7 shows a third embodiment. In this arrangement a spring 82 having a relatively small spring constant is provided about the lower section of the piston rod 14. This spring 82 has an outwardly tapering upper end which enagages the lower inner periphery of the outer tube and a inwardly tapering lower section which engages a suitable step on the one of the piston rod or the connection member 41 fixedly attached thereto. This spring is formed of an electrically conductive material and thus provides an electrical connection between the outer tube 12 and the piston rod 14.

Figure 8:
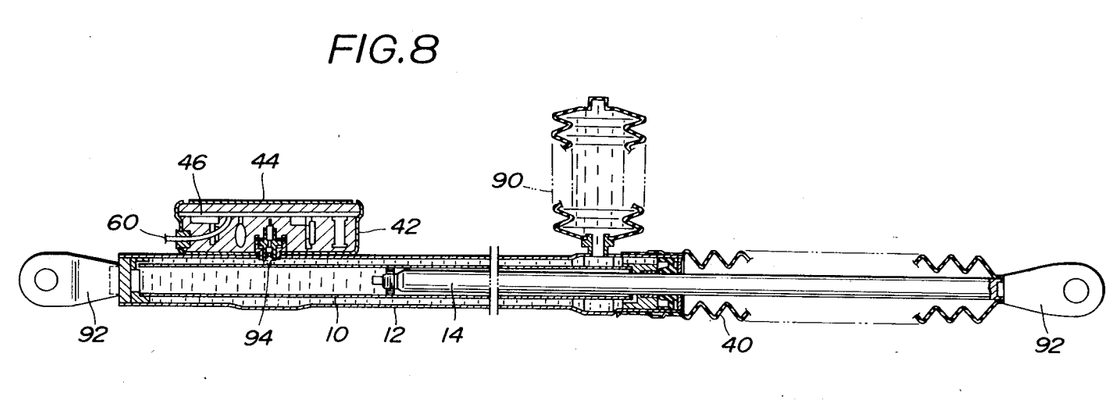
FIG. 8 is a sectional elevation of a fourth embodiment of the present invention.

FIG. 8 shows a fourth embodiment of the present invention. In this instance the invention is applied to a shock absorber of the type which is equipped with a bellows 90 into which hydraulic can be pumped. This bellows 90 replaces the reservoir 40 provided at the top of the arrangement to which the first to third embodiments of the invention are applied.

The construction and arrangement of this arrangement is essentially similar to those described hereinbefore. The provision of metal mounting members 92 at both ends of the arrangement of course provides for the grounding of the absorber at both ends thereof. Nevertheless, the dust boot 40 used in this embodiment is arranged to be electrically conductive as in the former arrangements ensuring a good electrical connection between the piston rod 14 and the outer tube 12.

Figure 9:
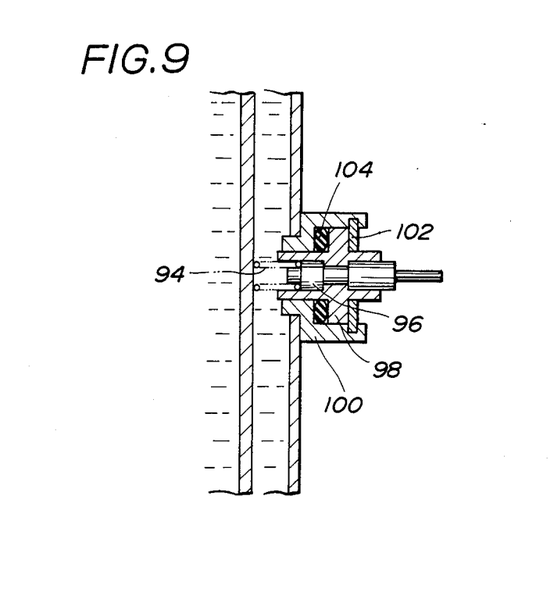
FIG. 9 is a sectional view of an electrode arrangement employed in the fourth embodiment.

In this embodiment the electrode which establishes electrical connection between the inner tube 10 and the printed board 46 of the sensor circuit takes the form of a spring 94 which is, as best seen in FIG. 9, arranged to contact the inner tube 10 at one end and seat on a stepped diameter section of a conductive member 96 at the other. This member 96 is disposed in electrically insulating member 98 and retained in a case 100 fixed to the side of the outer tube 12 by collar member 102. An O-ring 104 is sealingly interposed between the insulating member and the inner wall of the case to ensure that a hermetic seal is maintained at all times.

Figure 10:
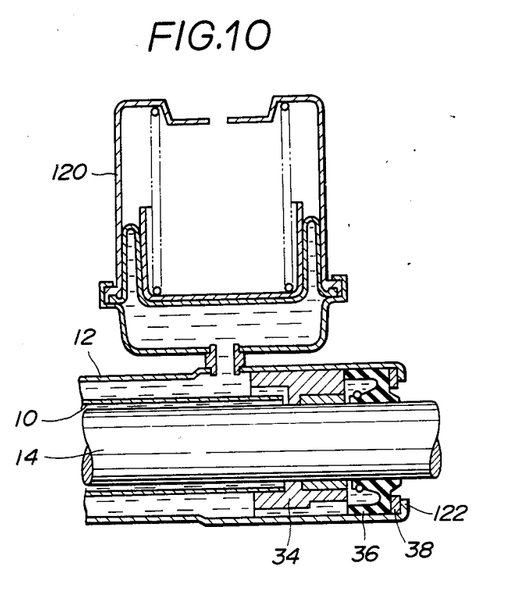
FIGS. 10 and 11 are sectional views of sections of fifth and sixth embodiments, respectively.
Figure 11:
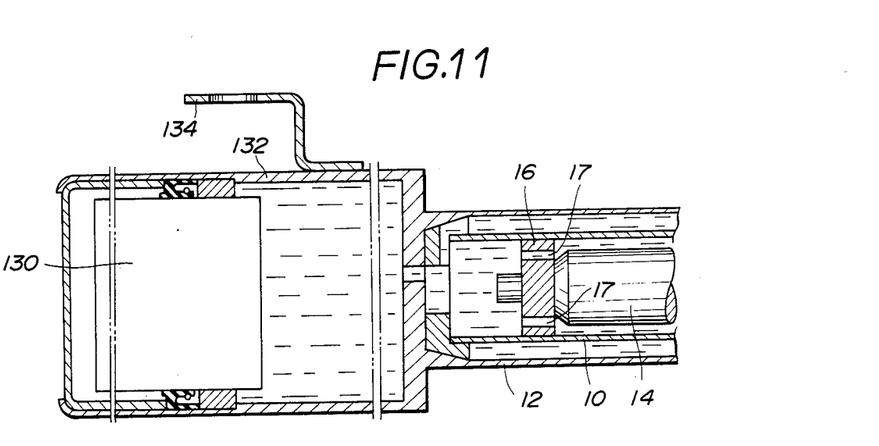
Figure 12:
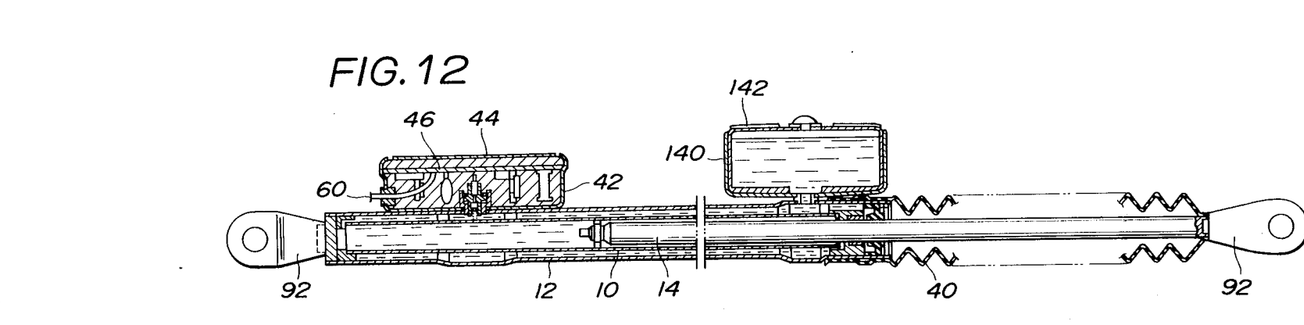
FIGS. 12 to 15 show a seventh embodiment of the present invention.
Figure 13:
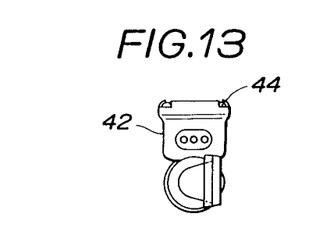
Figure 14:
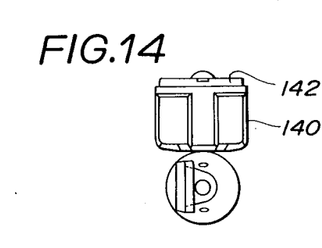
Figure 15:
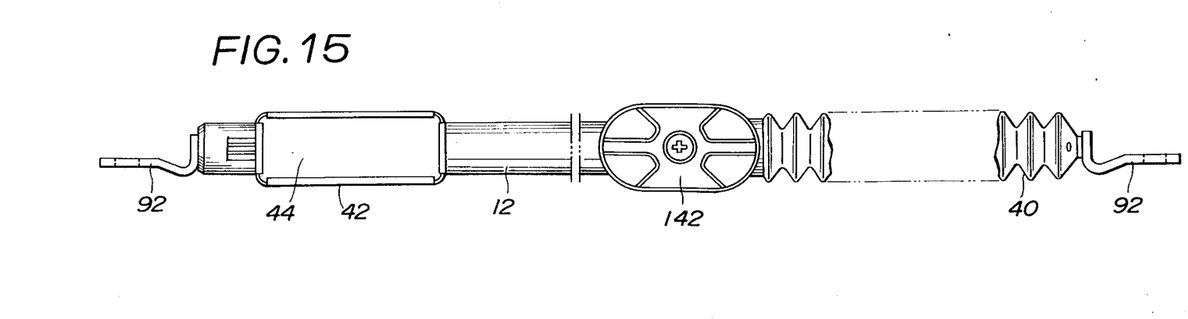

FIGS. 10 and 11 show variants of the fourth embodiment. In the embodiment shown in FIG. 10 the bellows is replaced with a spring loaded diaphragm arrangement 120 while in that shown in FIG. 11 a free piston 130 is disposed at one end of the absorber. The casing 132 in which the free piston 130 is housed includes a mounting bracket 134. In this instance the free piston 130 is interposed between the hydraulic fluid which defines the working fluid of the absorber and air contained in the upper section of the free piston housing or casing 134.

The arrangement shown in FIG. 10 is such that the end of the outer tube is formed with an inwardly depending flange 122 which retains cover 38 and seal 36 secure in place.

FIGS. 12 to 15 show a seventh embodiment of the present invention. This arrangement is essentially similar to that shown in FIG. 8 and differs in that the bellows arrangement is replaced with a closed reservoir 140. In this instance the reservoir has a removable filler cap 142 provided thereon.

Figure 16:
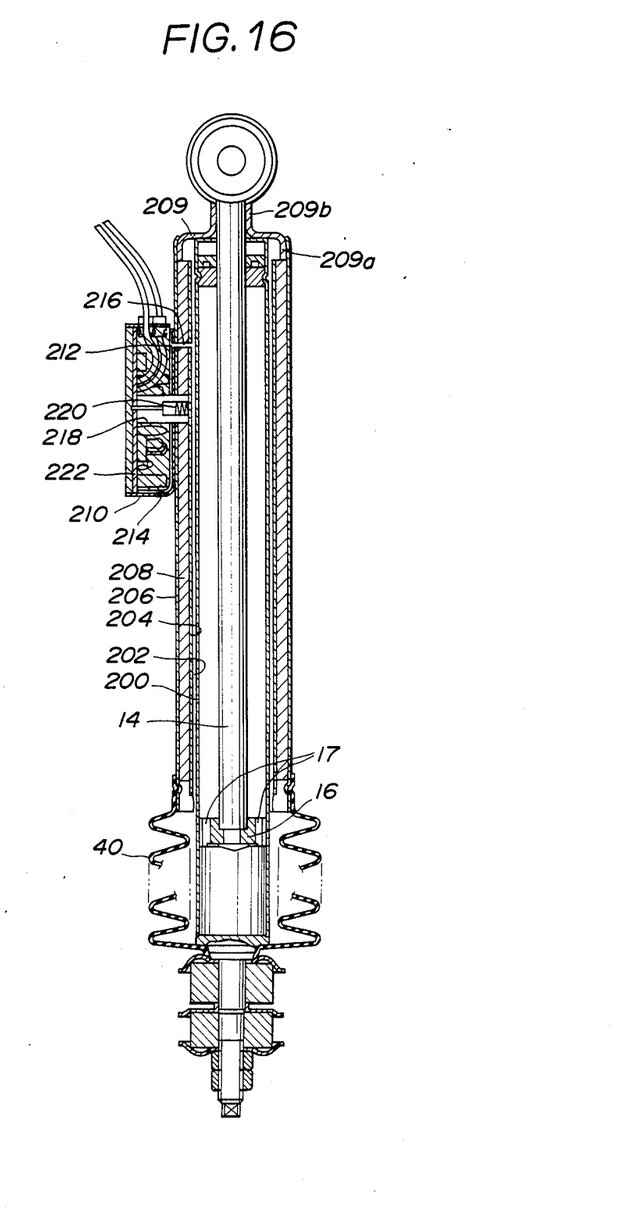
FIG. 16 shows an eighth embodiment of the present invention.

FIG. 16 shows an eight embodiment of the present invention. This arrangement differs from the previous ones in that it is arranged to define first and second capacitors, one of which functions as a reference and the other as a measuring element.

In this device the piston is arranged to be reciprocal within a tube 200 which shall be referred to as a cylinder tube. This element 200 is formed of an electrically conductive material.

Coaxially disposed about the cylinder tube in manner to define a narrow air gap 202 in an inner tube 204. A outer tube 206 is disposed coaxially about in the inner one. The annular space 208 defined between the inner and outer tubes 204, 206 is filled with an electrically insulative substance. With this arrangement the inner tube 202 is insulatingly supported in close proximity of the cylinder tube 200.

A conductive metal cap 209 is provided at the upper end of the absorber unit. This cap includes a large diameter flange section 209a in electrical contact with the outer tube 206 and a narrow diameter flange section 209b in electrical contact with the piston rod 14. The upper end of the cylinder tube 200 is formed with an inwardly depending flanged portion which abuts against cap 209 establishing electrical contact therebetween. With this arrangement outer tube 206, piston rod 14 and cylinder tube 200 are simultaneously connected to earth via an electrically conductive metal eye member 14a provided at the upper end of the piston rod 14.

The housing or casing 210 in which the sensor circuit is disposed is arranged so that a narrow air gap 212 is formed therein between the outer tube and the inboard surface of the sensor circuit arrangement. A small air bleed 214 is formed in the casing in which the circuit is housed so as to maintain the air gap constantly at atmospheric pressure. A small diameter passage 216 is formed through the outer tube 206, insulating layer and the inner tube 204 in a manner to fluidly communicate the air bleed 214 and the air gap 202.

A blind bore 218 is formed in the outer tube 206 and insulating layer to permit an electrode arrangement including a spring 220 to establish electric contact between the printed circuit board 222 of the sensor circuit and the inner tube 204.

In this embodiment the inner tube 204 and the cylinder tube 200 are used to define a first or measuring capacitor Cs while the outer tube 206 and inner tube 204 are used to define a second or reference capacitor Co.

Figure 17:
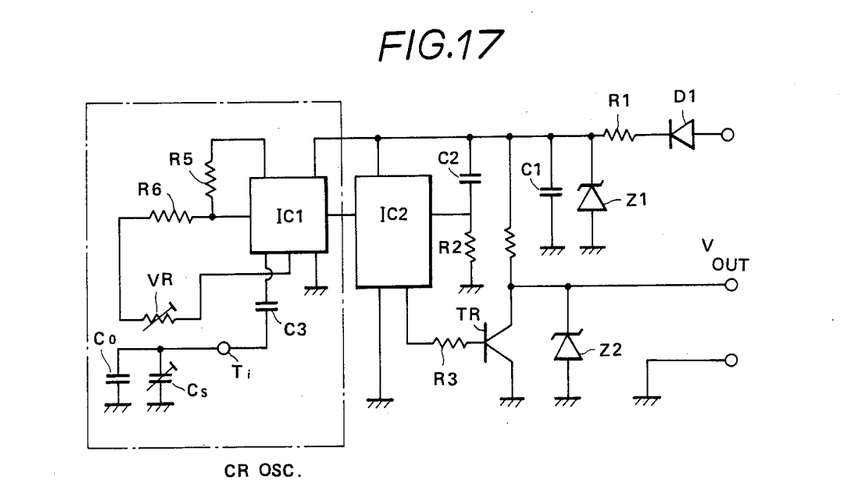
FIG. 17 shows a circuit used in conjunction with the embodiment shown in FIG. 16.

FIG. 17 shows a circuit arrangement which can be used in the sensor circuit. As will be appreciated this circuit is formed to include a CR oscillator section which includes an integrated circuit chip IC1 which functions as a timer and which emits a pulse signal the pulse width of which is fixed and the frequency of which is variable. By way of example this chip may take the form of one which is commercially available on the Japanese Market under the designation of NE 555.

This section of the circuit includes a feedback resistor R5 an input resistor R6, and a thermistor VR. The latter mentioned element is arranged to correct the variation which occurs in capacitance with change in temperature.

A capacitor C3 is circuited between terminal Ti and IC1. This terminal is in connected with electrode 220. Capacitors Co and Cs in this figure are in fact defined by the coaxially arranged tubular members and not actual elements in the circuit per se.

Integrated circuit element IC2 takes the form of a frequency divider which is connected with a source of EMF via a supply stabilizing arrangement including a serially arranged diode D1 and resistor R1 and parallely connected capacitor C1 and zener diode 21.

Serially arranged capacitor C2 and resistor R2 are coupled with the frequency divider (IC2) in a manner to derive a voltage which proportionally varies with the frequency division.

The output of the frequency divider (IC2) is applied to the base of a transistor TR via transistor R3. The collector of this transistor is circuited with an Vout terminal and with the source of EMF via transistor R4. With this arrangement the voltage produced at terminal Vout varies with the signal applied to the base of transistor TR and thus varies with the degree of extension of the shock absorber. Zener diode Z2 is circuited as shown in a manner to attenuate noise.

It will be understood that the above circuit is merely an example of circuit which can be used in conjunction with the present invention.

What is claimed is:

1. A position sensor device comprising:
   a housing containing a first fluid of known dielectric constant, said housing being formed of an electrically conductive material;
   an outer elongated first hollow member insulatingly supported within said housing in a contact free relationship therewith and exposed to said first fluid, said outer hollow member being formed of an electrically conductive material;
   an inner hollow member, said inner hollow member being disposed within said outer hollow member in a contact free and electrically isolated relationship therewith, said inner hollow member being filled with a second fluid, a shaft reciprocatingly disposed in said inner hollow member in manner to define a clearance therebetween, said shaft being formed of an electrically conductive material and supported within said inner hollow member in a contact free and electrically insulated relationship therewith;

means for establishing simultaneous electrical connection between said housing, said inner hollow member and said shaft and with a source of electrical ground; and a circuit for measuring capacitance developed in a first capacitor developed between said inner and outer hollow members and a second capacitor developed between said housing and said outer hollow member.

2. A device as claimed in claim 1 wherein said housing includes a structure for supporting said circuit on the device.

3. A position sensor device comprising:

a housing containing a fluid of known dielectric constant, said housing being formed of an electrically conductive material;

a first elongate hollow member insulatingly supported within said housing in a contact free relationship therewith and immersed in said fluid, said first hollow member being formed of an electrically conductive material;

a shaft reciprocatingly disposed in said first hollow member in manner to define a clearance therebetween, said shaft being formed of an electrically conductive material and supported within said first hollow member in a contact free and electrically insulated relationship therewith;

means for establishing simultaneous electrical connection between said housing and said shaft with a source of electrical ground;

a circuit for measuring capacitance developed between said shaft and said first hollow member;

a second hollow member, said second hollow member being disposed within said first hollow member in a contact free and electrically isolated relationship therewith, said second hollow member being filled with said fluid and connected with said source of electrical ground by said electrical connection establishing means, said first and second hollow members defining a first capacitor and said housing and said first hollow member defining a second capacitor; and an air gap defined between said first and second hollow members, said air gap containing an insulating layer of air, said air gap being constantly communicated with the ambient atmosphere by a passage structure which includes a vent open to said ambient atmosphere.

4. A device as claimed in claim 3, wherein said electrical connection establishing means takes the form of a flexible electrically conductive elastomeric member which is attached at one end to said housing and at the other end to one of said shaft and an electrically conductive connection member fixedly connected therewith.

5. A device as claimed in claim 3, wherein said electrical connection establishing means takes the form of a brush which is connected to said housing and which contacts said shaft.

6. A device as claimed in claim 3 wherein said electrical connection establishing means takes the form of a spring which abuts said housing at one end thereof and which abuts one of said shaft and an electrically conductive connection member fixedly connected therewith.

7. A device as claimed in claim 1, wherein said first fluid is air and which further comprises an insulating gap defined between said inner and outer hollow members, said insulating gap containing an insulating layer of said first fluid, said insulating gap being constantly communicated with the ambient atmosphere by a passage structure which includes a vent open to the ambient atmosphere.

8. A device as claimed in claim 3, further comprising a casing on said housing, said housing receiving said circuit therein, said circuit including a CR oscillator and a frequency divider.

9. A device as claimed in claim 8, further comprising an electrode which establishes electrical connection between said circuit and said first hollow member.

10. A device as claimed in claim 9 wherein said electrode takes the form of a electrode member which is sealingly disposed through an aperture formed in said housing and which contacts the outer surface of said first hollow member.

11. A device as claimed in claim 10, wherein the interior of said housing and said first hollow member are filled with said fluid so as to immerse said hollow member and said electrode member therein.

12. A device as claimed in claim 10, wherein said electrode member includes a spring, said spring being arranged to abut said first hollow member and establish electrical contact therewith.

13. A device as claimed in claim 1, wherein said electrical connection establishing means takes the form of a electrically conductive cap member which is disposed on said housing and which has a portion in contact with said shaft, said inner hollow member having a portion in electrical contact with said cap member.

14. A device as claimed in claim 1, wherein said housing includes a second outer tube, said second outer tube being arranged about the first outer tube and separated therefrom by a layer of electrically insulating material interposed therebetween.

* * * * *